(No Model.)  2 Sheets—Sheet 1.

J. HAHN.
BRAKE OPERATING MECHANISM FOR MOTORS.

No. 423,555. Patented Mar. 18, 1890.

WITNESSES
Wm. A. Lowe
Wm. Wagner

INVENTOR
John Hahn
by his attorneys
Roeder & Briesen (No Model.) 2 Sheets—Sheet 2.

J. HAHN.
BRAKE OPERATING MECHANISM FOR MOTORS.

No. 423,555. Patented Mar. 18, 1890.

WITNESSES
Wm H Lowe
Wm F Wagner

INVENTOR
John Hahn
by his attorneys
Roeder & Brrern

UNITED STATES PATENT OFFICE.

JOHN HAHN, OF NEW YORK, N. Y.

BRAKE-OPERATING MECHANISM FOR MOTORS.

SPECIFICATION forming part of Letters Patent No. 423,555, dated March 18, 1890.

Application filed July 23, 1889. Serial No. 318,407. (No model.)

*To all whom it may concern:*

Be it known that I, JOHN HAHN, of New York city, New York, have invented an Improved Brake-Operating Mechanism for Motors, of which the following is a specification.

This invention relates to a device by which the engineer of a train is enabled to brake his cars and his motor from the power derived from the motor itself.

The invention, briefly stated, consists of a spirally-grooved rotating shaft engaged by a nose, which, in following the convolutions of the spiral, draws the cable controlling the brakes.

Figure 1:
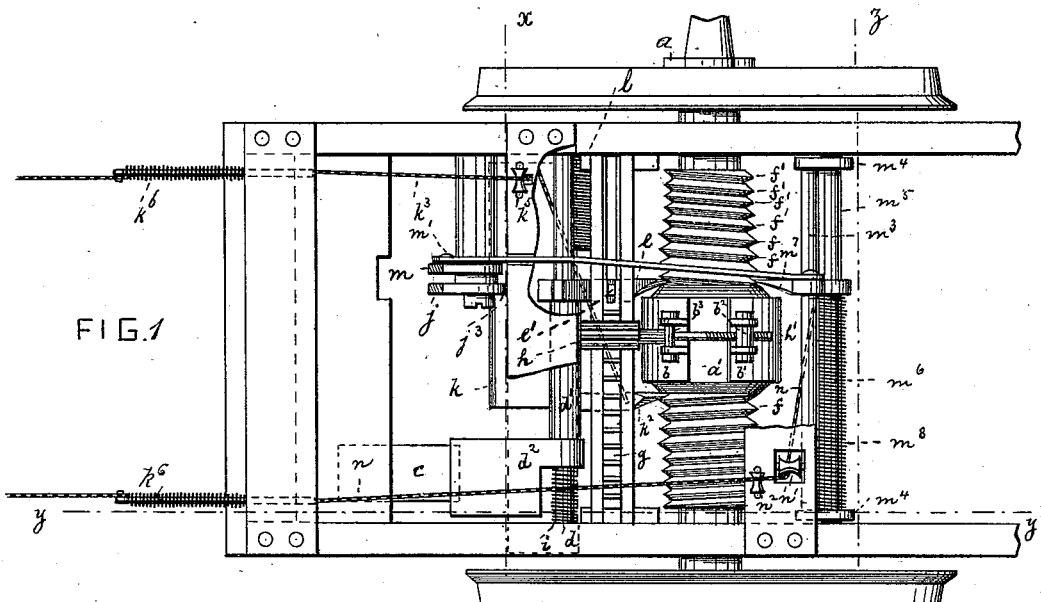
Figure 2:
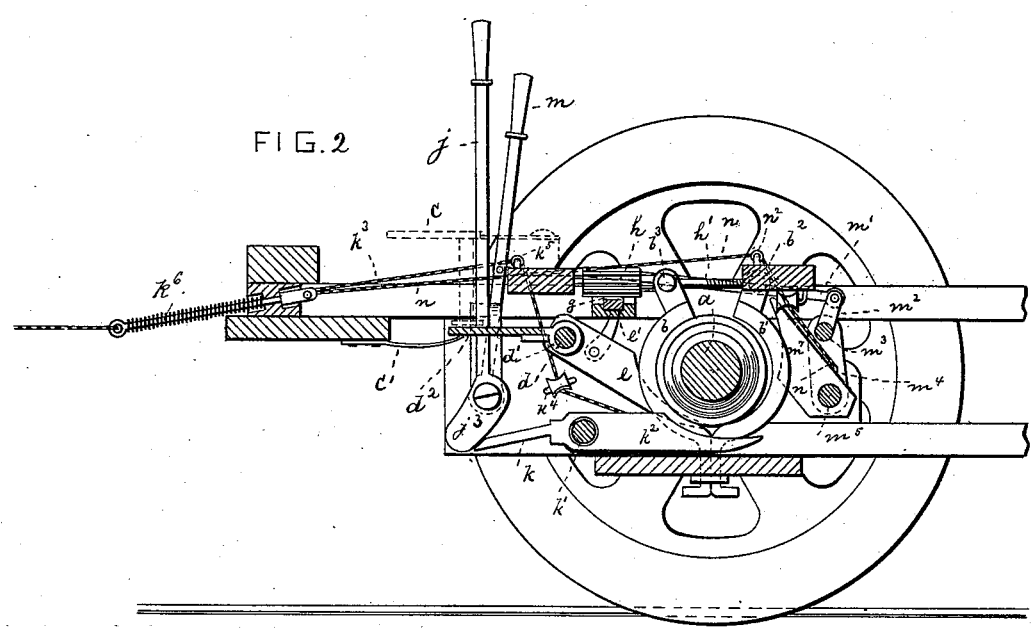
Figure 3:
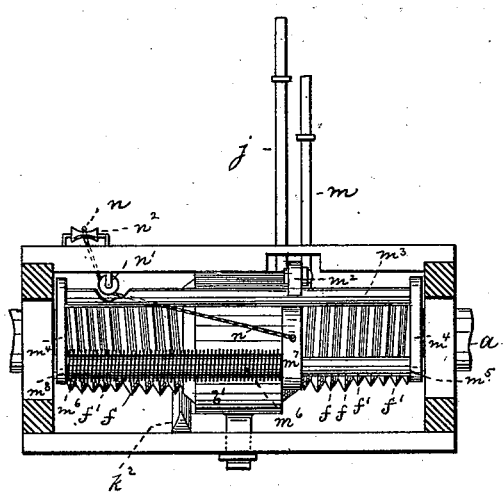
Figure 4:
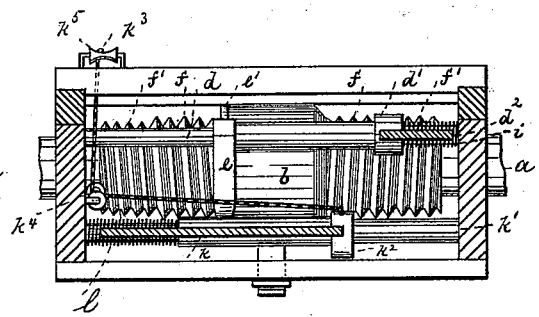
Figure 5:
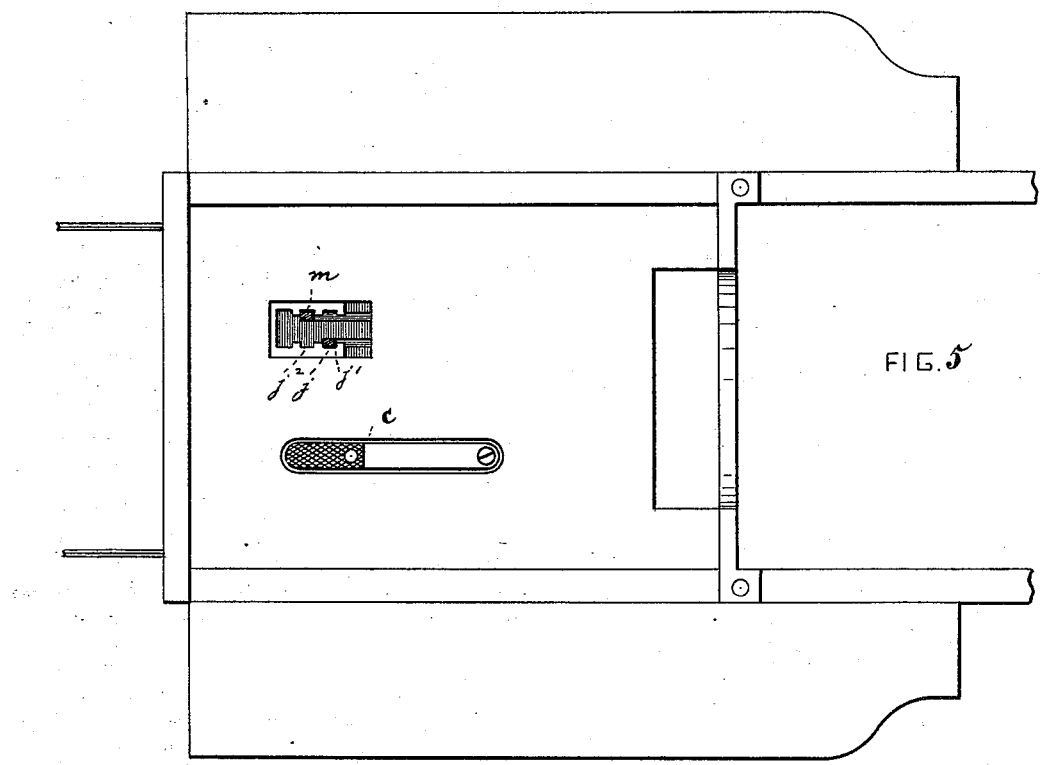

In the accompanying drawings, Figure 1 is a top view of my improved brake-operating device with treadle removed. Fig. 2 is a vertical longitudinal section on line $y\ y$, Fig. 1. Fig. 3 is a cross-section on line $z\ z$, Fig. 1. Fig. 4 is a cross-section on line $x\ x$, Fig. 1; and Fig. 5, a top view of the floor of the cab.

The letter $a$ represents an axle or shaft connecting two of the wheels of a locomotive or other motor, so as to be revolved by such wheels. The central part $a'$ of axle $a$ is engaged by a pair of jaws $b\ b'$ of a clutch, free to open or close at the top, so as to grasp the axle. These jaws have for their object to brake the locomotive itself, and they are operated as follows: $c$ is a treadle rocking to a slight extent a sleeve $d'$ on shaft $d$ by bearing upon a projection $d^2$ of said sleeve. To the sleeve $d'$ there is secured a nose or projection $e$, which is slightly raised by the depression of the treadle.

The axle $a$, at either side of the clutch $b$, is grooved spirally, as shown. I prefer to make the axle of varying thickness—that is to say, the spiral ribs $ff$ near the center of the axle are of a larger diameter than the spirals $f'$ near the ends of the axle. The object of this construction is to enable full or half brakes to be applied, according to a more or less deep engagement of the nose or noses with the grooves of the axle, as hereinafter described.

The nose $e$ by a bar $e'$ is connected to a sliding rack $g$. This rack is engaged by a pinion $h$, fast on screw-shaft $h'$. This screw-shaft passes through a threaded bearing $b^2$ of jaw $b'$ and through a perforated bearing $b^3$ of jaw $b$.

The operation of the device as thus far described is as follows: The treadle $c$, being depressed against action of spring $c'$, will rock sleeve $d'$ and cause the nose $e$ to enter the spiral groove of shaft $a$. This shaft on revolving will cause the nose to travel along the groove or from the center toward the end of the shaft. The nose will draw the sliding rack $g$ with it, and the rack will revolve pinion $h$. The pinion on revolving will cause the free ends of the jaws $b\ b'$ to be drawn together by means of the action of its screw-shaft upon the threaded bearing $b^2$. Thus the jaws will be tightly drawn together to clutch the shaft and brake the locomotive. The motion of the sliding rack causes the distension of a spring $i$, and thus after the train has stopped and pressure on the treadle has been released (so as to cause a release of the nose from the spiral groove) the spring $i$ will draw the rack back into its original position.

I will now describe the mechanism for operating the brakes on the cars.

$j$ is a hand-lever, that may be thrown back to engage either of a pair of notches $j'\ j^2$, the former being the "half-brake" and the latter the "full-brake" notch. The hand-lever $j$ is provided with a cam $j^3$, bearing upon a perforated plate or sleeve $k$, free to slide and rock upon a shaft $k'$, and provided with a nose $k^2$, that by the oscillation of sleeve $k$ is thrown into engagement with the spiral groove of shaft $a$. To nose $k^2$ there is connected cable $k^3$, running over pulleys $k^4\ k^5$ and operating the brakes on the cars. On this cable there may be the tension device $k^6$ to take up any slack.

If the hand-lever $j$ is thrown back, the sleeve $k$ is rocked, so as to cause an engagement of its nose $k^2$ with the spiral groove of shaft $a$. By the revolution of this shaft the nose is drawn along from the center toward the end of the shaft. This causes a direct pull upon cable $k^3$, that applies the brakes. When the lever $j$ is released, the sleeve $k$ is rocked backward by a spring $l$, which at the same time draws the sleeve $k$ laterally into its normal position, such spring having been both twisted and compressed by the previous action of the parts.

When the lever $j$ is thrown only into the half-brake notch $j'$, the nose $k^2$ is rocked so far only that, though it engages the spiral ribs $f$, it is liberated as soon as it passes these ribs and reaches the ribs $f'$. In this way the brakes are applied but by a light pressure, inasmuch as the cable is not drawn perfectly taut; but when the lever $j$ is thrown back into the full-brake notch $j^2$ the nose $k^2$ is rocked so far that it will be engaged and held by the ribs $f'$ as well as by the ribs $f$. Thus it will not be released until after it has cleared ribs $f$ and $f'$, and this causes the cable to be stretched perfectly taut.

In order to provide a positive withdrawal of the brake-shoes after the train has been stopped, I employ a second lever $m$, which by rods $m'$ $m^2$ engages a shaft $m^3$, connected by arms $m^4$ to a rock-shaft $m^5$. Upon rock-shaft $m^5$ there slides a sleeve $m^6$, carrying nose $m^7$ and having spring $m^8$. The nose $m^7$ engages the shaft $a$ at the side opposite to nose $k^2$. By throwing lever $m$ backward it draws shaft $m^3$ back with it. This shaft bears directly against nose $m^7$, and thus throws the nose into engagement with the spiral groove of shaft $a$. The nose $m^7$ is attached to a cable $n$, running over pulley $n'$ $n^2$, and which is connected to the brakes, so as to take them off when the cable is drawn taut. The revolution of shaft $a$ causes the nose to travel along its groove in the manner described, so as to draw the cable taut. After the train has started the parts are thrown back into their original position by spring $m^8$. Of course either one of the levers $m$ $j$ may be applied for putting on or taking off the brakes, according to its connection with the brake-shoes. The invention may be applied to steam, electric, and other motors.

What I claim is—

1. The combination of a motor having a spirally-grooved shaft with a sliding vibrating nose and with a lever or treadle for causing an engagement of the nose with the shaft, substantially as specified.

2. The combination of a shaft having two differently-sized spiral ribs with a vibrating and sliding nose adapted to engage the ribs, substantially as specified.

3. The combination of a spirally-grooved shaft $a$ with a pair of jaws $b$ $b'$, a nose, a rack, a pinion engaged by the rack, and with a screw-shaft revolved by the pinion and adapted to operate the jaws $b$ $b'$, substantially as specified.

4. The combination of a spirally-grooved shaft with a sleeve, a nose connected thereto, a lever for vibrating the sleeve, and a spring for throwing the sleeve back after the nose has been released, substantially as specified.

5. The combination of a spirally-grooved shaft $a$ with rod $m^3$, arms $m^4$, rod $m^5$, and with sleeve $m^6$, carrying nose $m^7$, substantially as specified.

6. The combination of a revolving spirally-grooved shaft with a sliding sleeve carrying a nose that engages the shaft and is connected to the brake-shoes, and with a lever for turning the sleeve, substantially as specified.

JOHN HAHN.

Witnesses:
GEO. V. THAME,
F. V BRIESEN.